United States Patent
Gan et al.

(10) Patent No.: US 10,090,916 B2
(45) Date of Patent: Oct. 2, 2018

(54) OPTICAL MODULE AVAILABILITY DETECTION METHOD AND APPARATUS

(71) Applicant: Huawei Technologies Co., Ltd., Shenzhen (CN)

(72) Inventors: Cheng Gan, Nanjing (CN); Yan Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 14/978,970

(22) Filed: Dec. 22, 2015

(65) Prior Publication Data

US 2016/0191153 A1    Jun. 30, 2016

(30) Foreign Application Priority Data

Dec. 26, 2014    (CN) .......................... 2014 1 0829082

(51) Int. Cl.
*H04B 10/08* (2006.01)
*H04B 10/077* (2013.01)
(Continued)

(52) U.S. Cl.
CPC ....... *H04B 10/077* (2013.01); *G06F 13/4291* (2013.01); *H04B 10/0799* (2013.01)

(58) Field of Classification Search
CPC .. H04B 10/077; H04B 10/073; H04B 10/075; H04B 10/771; H04B 10/0779; H04B 10/079; H04B 10/0795; H04B 10/0799
(Continued)

(56) References Cited

U.S. PATENT DOCUMENTS

| | | | |
|---|---|---|---|
| 6,771,904 B1 * | 8/2004 | Sasaki ................ | H04B 10/0775 398/16 |
| 7,925,158 B2 * | 4/2011 | Turukhin ........... | H04B 10/0775 398/16 |

(Continued)

FOREIGN PATENT DOCUMENTS

| | | |
|---|---|---|
| CN | 102590689 A | 7/2012 |
| CN | 103048116 A | 4/2013 |

(Continued)

OTHER PUBLICATIONS

Foreign Communication From A Counterpart Application, European Application No. 15199529.7, Extended European Search Report dated May 19, 2016, 6 pages.

(Continued)

*Primary Examiner* — Hanh Phan
(74) *Attorney, Agent, or Firm* — Conley Rose, P.C.

(57) ABSTRACT

A detection apparatus concurrently connected to N optical module cages by using N paths. The apparatus accesses a conflict register, acquires an occupancy status of the N paths according to a value of the conflict register, then performs a concurrent probe on M optical module cages connected to M paths that are in the N paths and whose occupancy status are not occupied by system software, to obtain a probe result, where the probe result includes availability information of optical modules of the M optical module cages and a type of the optical modules, and finally, writes the probe result into an availability register, so that the system software can acquire the probe result from the availability register. Therefore, whether an optical module is available in an optical module cage can be monitored in real time and fast insertion and removal operations on the optical module can be sensed.

22 Claims, 5 Drawing Sheets

(51) Int. Cl.
*G06F 13/42* (2006.01)
*H04B 10/079* (2013.01)

(58) Field of Classification Search
USPC ........ 398/16, 3, 5, 2, 22, 23, 24, 25, 26, 27, 398/30, 31, 32, 38, 9, 10, 13, 17, 66, 68, 398/58, 33; 356/73.1
See application file for complete search history.

(56) References Cited

U.S. PATENT DOCUMENTS

| | | |
|---|---|---|
| 2004/0197101 A1 | 10/2004 | Sasser et al. |
| 2004/0268138 A1 | 12/2004 | Larson et al. |
| 2008/0091788 A1 | 4/2008 | Feng |
| 2011/0135312 A1 | 6/2011 | El-Ahmadi et al. |
| 2013/0156417 A1 | 6/2013 | Chou et al. |
| 2013/0202002 A1 | 8/2013 | Hung et al. |
| 2014/0149617 A1 | 5/2014 | Chiang et al. |

FOREIGN PATENT DOCUMENTS

| | | |
|---|---|---|
| CN | 103701723 A | 4/2014 |
| CN | 104038275 A | 9/2014 |
| JP | 2005004745 A | 1/2005 |
| JP | 2006054316 A | 2/2006 |
| JP | 2009130431 A | 6/2009 |

OTHER PUBLICATIONS

Machine Translation and Abstract of Japanese Publication No. JP2006054316, Feb. 23, 2006, 21 pages.
Machine Translation and Abstract of Japanese Publication No. JP2009130431, Jun. 11, 2009, 14 pages.
Foreign Communication From A Counterpart Application, Japanese Application No. 2015-254363, Japanese Notice of Allowance dated May 30, 2017, 3 pages.
Machine Translation and Abstract of Chinese Publication No. CN102590689, Jul. 18, 2012, 11 pages.
Machine Translation and Abstract of Chinese Publication No. CN103048116, Apr. 17, 2013, 24 pages.
Machine Translation and Abstract of Chinese Publication No. CN103701723, Apr. 2, 2014, 10 pages.
Machine Translation and Abstract of Chinese Publication No. CN104038275, Sep. 10, 2014, 6 pages.
Foreign Communication From A Counterpart Application, Chinese Application No. 201410829082.0, Chinese Office Action dated Feb. 24, 2018, 5 pages.

* cited by examiner

OPTICAL MODULE AVAILABILITY DETECTION METHOD AND APPARATUS

CROSS-REFERENCE TO RELATED APPLICATION

This application claims priority to Chinese Patent Application No. 201410829082.0, filed on Dec. 26, 2014, which is hereby incorporated by reference in its entirety.

TECHNICAL FIELD

Embodiments of the present disclosure relate to the field of communications technologies, and in particular, to an optical module availability detection method and apparatus.

BACKGROUND

A small form-factor pluggable (SFP) transceiver, which is also called an optical module, is a small form-factor pluggable optical transceiver, which is used for optical communication applications in telecommunications and data communications and is generally packaged in a standard SFP cage. A compact SFP (CSFP) is an optical module in which two single-fiber bidirectional optical transceivers are packaged in a standard SFP cage. A device for which a CSFP is used can have a doubled quantity of ports with a quantity of optical module cages remaining the same, which can meet requirements for high density and low costs.

Although a single-fiber bidirectional optical transceiver is used for a CSFP, two pairs of receive and transmit lines are still needed when an optical module cage in which the CSFP is packaged is connected to a socket of a communications device that supports an optical module. Therefore, a transmit signal of a second transceiver in the CSFP needs to occupy a pin of an availability signal of an optical module cage; in this case, whether the optical module is available cannot be determined by using a level of the availability signal.

A manner of using system software to perform I2C polling is generally used to determine whether an optical module is available in an SFP cage, that is, the system software sends a request signal to an Inter-Integrated Circuit (I2C or I²C) path corresponding to each optical module cage, and then determines, according to whether a response is received from the I2C path, whether an optical module is available. However, the I2C polling performed by the system software occupies a large quantity of central processing unit (CPU) resources, resulting in an increase of CPU usage. In addition, there is a polling period when the I2C polling is performed by using the system software. If there are a relatively large quantity of optical module cages, the polling time is long, and whether an optical module is available in an SFP cage cannot be monitored in real time. Further, because the I2C polling time is long, fast insertion and removal operations on the optical module may not be sensed when the I2C polling is performed by using the system software.

SUMMARY

This application provide an optical module availability detection method and apparatus, so that in a case in which CPU usage is not increased, the following problems in the prior art can be resolved: whether an optical module is available in an optical module cage cannot be monitored in real time and fast insertion and removal of the optical module cannot be sensed.

A first aspect provides an optical module availability detection method, which is applied to a detection apparatus, where the detection apparatus is concurrently connected to N optical module cages by using N paths, and the method includes: accessing a conflict register, and acquiring an occupancy status of the N paths according to a value of the conflict register; performing a concurrent probe on M optical module cages connected to M paths that are in the N paths and whose occupancy status are not occupied by system software, to obtain a probe result, where the probe result includes availability information of optical modules of the M optical module cages and a type of the optical modules, wherein M and N are both positive integers, and M is less than or equal to N; and writing the probe result into an availability register, so that the system software acquires the probe result from the register.

With reference to the first aspect, in a first possible implementation manner, the performing a concurrent probe on M optical module cages connected to M paths that are in the N paths and whose occupancy status are not occupied by system software, to obtain a probe result includes: performing a concurrent probe on a first preset address for the M optical module cages, where for any optical module cage in the M optical module cages, if it is determined, by probing, that no optical module is available in the first preset address, it is determined that no optical module is available in the first optical module cage; if it is determined, by probing, that an optical module is available in the first preset address, a probe is performed on a second preset address for the any optical module cage; and if it is determined, by probing, that no optical module is available in the second preset address, it is determined that an optical module is available in the any optical module cage; if it is determined, by probing, that an optical module is available in the second preset address, it is determined that a compact optical module is available in the first optical module cage.

With reference to the first aspect, in a second possible implementation manner, the performing a concurrent probe on M optical module cages connected to M paths that are in the N paths and whose occupancy status are not occupied by system software, to obtain a probe result includes: performing a concurrent probe on a first preset address for the M optical module cages, and performing a concurrent probe on a second preset address for the M optical module cages, where for any optical module cage in the M optical module cages, if it is determined, by probing, that no optical module is available in the first preset address, it is determined that no optical module is available in the any optical module cage; if it is determined, by probing, that an optical module is available in the first preset address and no optical module is available in the second preset address, it is determined that an optical module is available in the any optical module; and if it is determined, by probing, that an optical module is available in the first preset address and an optical module is available in the second preset address, it is determined that a compact optical module is available in the any optical module.

With reference to the first or the second possible implementation manner of the first aspect, in a third possible implementation manner, the N paths are N inter-integrated circuit I2C paths, each I2C path includes a serial clock (SCL) path and a serial data (SDA) path, the SCL path is controlled by an SCL level register, and the SDA path is controlled by an SDA level register and an SDA control register; and the performing a concurrent probe on a first preset address for the M optical module cages includes: a. determining, according to a preset I2C time sequence, a current operation and target paths corresponding to the current operation; and determining, according to the current operation, a first register value to be written into a register corresponding to the target paths; b. reading a current second register value of the register corresponding to the target paths; c. after negation is performed on the value of the conflict register, performing an AND operation on a negated value of the conflict register and the first register value, to obtain a third register value, and performing an AND operation on the value of the conflict register and the second register value, to obtain a fourth register value; d. performing an OR operation on the third register value and the fourth register value to obtain a fifth register value, and writing the fifth register value into the register corresponding to the target paths, wherein the target paths are SCL paths of the M paths or SDA paths of the M paths; if the target paths are the SCL paths of the M paths, the register corresponding to the target paths is the SCL level register; if the target paths are the SDA paths of the M paths, the register corresponding to the target paths is the SDA level register or the SDA control register; and repeatedly performing step a, step b, step c and step d according to the preset I2C time sequence until statuses of the SDA paths of the M paths are switched from output to input; e. reading a sixth register value of the SDA level register; f. reading a seventh register value of an availability register corresponding to the first preset address; g. after negation is performed on the value of the conflict register, performing an AND operation on the negated value of the conflict register and the sixth register value, to obtain an eighth register value, and performing an AND operation on the value of the conflict register and the seventh register value, to obtain a ninth register value; and h. performing an OR operation on the eighth register value and the ninth register value, to obtain a tenth register value to be written into the availability register corresponding to the first preset address, where the tenth register value is used to indicate the probe result that is obtained after the probe is performed on the first preset address for the M optical module cages.

With reference to the second possible implementation manner of the first aspect, in a fourth possible implementation manner, the N paths are N inter-integrated circuit I2C paths, each I2C path includes a SCL path and a SDA path, the SCL path is controlled by an SCL level register, and the SDA path is controlled by an SDA level register and an SDA control register; and the performing a concurrent probe on a second preset address for the M optical module cages includes: a. determining, according to a preset I2C time sequence, a current operation and target paths corresponding to the current operation; and determining, according to the current operation, a first register value to be written into a register corresponding to the target paths; b. reading a current second register value of the register corresponding to the target paths; c. after negation is performed on the value of the conflict register, performing an AND operation on a negated value of the conflict register and the first register value, to obtain a third register value, and performing an AND operation on the value of the conflict register and the second register value, to obtain a fourth register value; d. performing an OR operation on the third register value and the fourth register value to obtain a fifth register value, and writing the fifth register value into the register corresponding to the target paths, wherein the target paths are SCL paths of the M paths or SDA paths of the M paths; if the target paths are the SCL paths of the M paths, the register corresponding to the target paths is the SCL level register; if the target paths are the SDA paths of the M paths, the register corresponding to the target paths is the SDA level register or the SDA control register; and repeatedly performing step a, step b, step c and step d according to the preset I2C time sequence until statuses of the SDA paths of the M paths are switched from output to input; e. reading a sixth register value of the SDA level register; f. reading a seventh register value of an availability register corresponding to the second preset address; g. after negation is performed on the value of the conflict register, performing an AND operation on the negated value of the conflict register and the sixth register value, to obtain an eighth register value, and performing an AND operation on the value of the conflict register and the seventh register value, to obtain a ninth register value; and h. performing an OR operation on the eighth register value and the ninth register value, to obtain a tenth register value to be written into the availability register corresponding to the second preset address, where the tenth register value is used to indicate the probe result that is obtained after the probe is performed on the second preset address for the M optical module cages.

With reference to the third or the fourth possible implementation manner of the first aspect, in a fifth possible implementation manner, the preset I2C time sequence sequentially includes: a start time sequence, an address probe time sequence and a read/write time sequence, an acknowledgement time sequence, and a stop time sequence, where: operations in the start time sequence sequentially include: setting a level of the SDA path to a high level, setting a level of the SCL path to a high level, setting a level of the SDA path to a low level, and setting a level of the SCL path to a low level; operations in the address probe time sequence and the read/write time sequence sequentially include: setting a level of the SDA path to a high level, repeatedly performing step i, step j and step k for I times, and setting a level of the SCL path to a low level, where I is a preset value, and step i, step j and step k are: step i: setting a level of the SCL path to a low level; step j: setting a level of the SDA path according to the first preset address or the second preset address; and step k: setting a level of the SCL path to a high level; operations in the acknowledgement time sequence sequentially include: setting a level of the SCL path to a high level, switching the SDA path to an input status, setting the availability register corresponding to the first preset address or the second preset address, setting a level of the SCL path to a low level, and switching the SDA path to an output status; and operations in the stop time sequence sequentially include: setting a level of the SDA path to a low level, setting a level of the SCL path to a high level, and setting a level of the SDA path to a high level.

A second aspect provides a detection apparatus, where the detection apparatus is concurrently connected to N optical module cages by using N paths, and the apparatus includes: a reading module configured to: access a conflict register, and acquire an occupancy status of the N paths according to a value of the conflict register; a processing module configured to perform a concurrent probe on M optical module cages connected to M paths that are in the N paths and whose occupancy status are not occupied by system software, to obtain a probe result, where the probe result includes availability information of optical modules of the M optical module cages and a type of the optical modules, where M and N are both positive integers, and M is less than or equal to N; and a writing module configured to write the probe result into an availability register, so that the system software acquires the probe result from the register.

With reference to the second aspect, in a first possible implementation manner, the processing module is configured to: perform a concurrent probe on a first preset address for the M optical module cages, where for any optical module cage in the M optical module cages, if it is determined, by probing, that no optical module is available in the first preset address, it is determined that no optical module is available in the first optical module cage; if it is determined, by probing, that an optical module is available in the first preset address, a probe is performed on a second preset address for the any optical module cage; and if it is determined, by probing, that no optical module is available in the second preset address, it is determined that an optical module is available in the any optical module cage; if it is determined, by probing, that an optical module is available in the second preset address, it is determined that a compact optical module is available in the first optical module cage.

With reference to the second aspect, in a second possible implementation manner, the processing module is configured to: perform a concurrent probe on a first preset address for the M optical module cages, and perform a concurrent probe on a second preset address for the M optical module cages, where for any optical module cage in the M optical module cages, if it is determined, by probing, that no optical module is available in the first preset address, it is determined that no optical module is available in the any optical module cage; if it is determined, by probing, that an optical module is available in the first preset address and no optical module is available in the second preset address, it is determined that an optical module is available in the any optical module; and if it is determined, by probing, that an optical module is available in the first preset address and an optical module is available in the second preset address, it is determined that a compact optical module is available in the any optical module.

With reference to the first or the second possible implementation manner of the second aspect, in a third possible implementation manner, the N paths are N inter-integrated circuit I2C paths, each I2C path includes a SCL path and a SDA path, the SCL path is controlled by an SCL level register, and the SDA path is controlled by an SDA level register and an SDA control register; and the processing module is configured to: a. determine, according to a preset I2C time sequence, a current operation and target paths corresponding to the current operation; and determine, according to the current operation, a first register value to be written into a register corresponding to the target paths; b. read a current second register value of the register corresponding to the target paths; c. after negation is performed on the value of the conflict register, perform an AND operation on a negated value of the conflict register and the first register value, to obtain a third register value, and perform an AND operation on the value of the conflict register and the second register value, to obtain a fourth register value; d. performing an OR operation on the third register value and the fourth register value to obtain a fifth register value, and writing the fifth register value into the register corresponding to the target paths, wherein the target paths are SCL paths of the M paths or SDA paths of the M paths; if the target paths are the SCL paths of the M paths, the register corresponding to the target paths is the SCL level register; if the target paths are the SDA paths of the M paths, the register corresponding to the target paths is the SDA level register or the SDA control register; and repeatedly performing step a, step b, step c and step d according to the preset I2C time sequence until statuses of the SDA paths of the M paths are switched from output to input; e. read a sixth register value of the SDA level register; f. read a seventh register value of an availability register corresponding to the first preset address; g. after negation is performed on the value of the conflict register, perform an AND operation on the negated value of the conflict register and the sixth register value, to obtain an eighth register value, and perform an AND operation on the value of the conflict register and the seventh register value, to obtain a ninth register value; and h. perform an OR operation on the eighth register value and the ninth register value, to obtain a tenth register value to be written into the availability register corresponding to the first preset address, where the tenth register value is used to indicate the probe result that is obtained after the probe is performed on the first preset address for the M optical module cages.

With reference to the second possible implementation manner of the second aspect, in a fourth possible implementation manner, the N paths are N inter-integrated circuit I2C paths, each I2C path includes a SCL path and a SDA path, the SCL path is controlled by an SCL level register, and the SDA path is controlled by an SDA level register and an SDA control register; and the processing module is configured to: a. determine, according to a preset I2C time sequence, a current operation and target paths corresponding to the current operation; and determine, according to the current operation, a first register value to be written into a register corresponding to the target paths; b. read a current second register value of the register corresponding to the target paths; c. after negation is performed on the value of the conflict register, perform an AND operation on a negated value of the conflict register and the first register value, to obtain a third register value, and perform an AND operation on the value of the conflict register and the second register value, to obtain a fourth register value; d. performing an OR operation on the third register value and the fourth register value to obtain a fifth register value, and writing the fifth register value into the register corresponding to the target paths, wherein the target paths are SCL paths of the M paths or SDA paths of the M paths; if the target paths are the SCL paths of the M paths, the register corresponding to the target paths is the SCL level register; if the target paths are the SDA paths of the M paths, the register corresponding to the target paths is the SDA level register or the SDA control register; and repeatedly performing step a, step b, step c and step d according to the preset I2C time sequence until statuses of the SDA paths of the M paths are switched from output to input; e. read a sixth register value of the SDA level register; f. read a seventh register value of an availability register corresponding to the second preset address; g. after negation is performed on the value of the conflict register, perform an AND operation on the negated value of the conflict register and the sixth register value, to obtain an eighth register value, and perform an AND operation on the value of the conflict register and the seventh register value, to obtain a ninth register value; and h. perform an OR operation on the eighth register value and the ninth register value, to obtain a tenth register value to be written into the availability register corresponding to the second preset address, where the tenth register value is used to indicate the probe result that is obtained after the probe is performed on the second preset address for the M optical module cages.

With reference to the third or the fourth possible implementation manner of the second aspect, in a fifth possible implementation manner, the preset I2C time sequence sequentially includes: a start time sequence, an address probe time sequence and a read/write time sequence, an acknowledgement time sequence, and a stop time sequence, where: operations in the start time sequence sequentially include: setting a level of the SDA path to a high level, setting a level of the SCL path to a high level, setting a level of the SDA path to a low level, and setting a level of the SCL path to a low level; operations in the address probe time sequence and the read/write time sequence sequentially include: setting a level of the SDA path to a high level, repeatedly performing step i, step j and step k for I times, and setting a level of the SCL path to a low level, where I is a preset value, and step i, step j and step k are: step i: setting a level of the SCL path to a low level; step j: setting a level of the SDA path according to the first preset address or the second preset address; and step k: setting a level of the SCL path to a high level; operations in the acknowledgement time sequence sequentially include: setting a level of the SCL path to a high level, switching the SDA path to an input status, setting the availability register corresponding to the first preset address or the second preset address, setting a level of the SCL path to a low level, and switching the SDA path to an output status; and operations in the stop time sequence sequentially include: setting a level of the SDA path to a low level, setting a level of the SCL path to a high level, and setting a level of the SDA path to a high level.

The embodiments of the present disclosure provide an optical module availability detection method and apparatus, where the detection apparatus is concurrently connected to N optical module cages by using N paths. The apparatus accesses a conflict register, acquires an occupancy status of the N paths according to a value of the conflict register, then performs a concurrent probe on M optical module cages connected to M paths that are in the N paths and whose occupancy status are not occupied by system software, to obtain a probe result, where the probe result includes availability information of optical modules of the M optical module cages and a type of the optical modules, and finally, writes the probe result into an availability register, so that the system software can acquire the probe result from the register without executing any other action, and therefore, CPU usage is quite low. In addition, because the detection apparatus performs a concurrent probe on the M optical module cages, a probe time is quite short for each time and is much less than a time for fast insertion and removal operations. As a result, compared with a manner of using system software to perform polling in the prior art, in a case in which CPU usage is not increased, whether an optical module is available in an optical module cage can be monitored in real time and fast insertion and removal operations on the optical module can be sensed.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
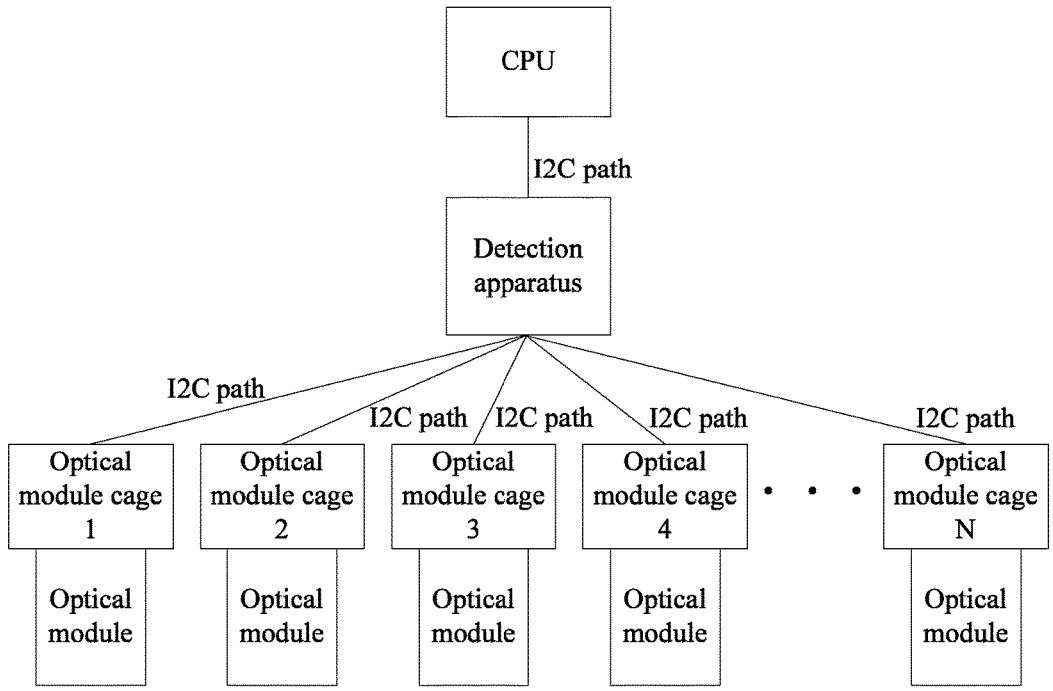
FIG. 1 is a schematic structural diagram of an application scenario according to an embodiment of the present disclosure.

As shown in FIG. 1, FIG. 1 is a schematic structural diagram of a network device according to an embodiment of the present disclosure, where the network device includes a CPU, a detection apparatus, and multiple optical module cages. By using the detection apparatus, the network device provided in this embodiment of the present disclosure can monitor in real time whether an optical module, such as a CSFP and an SFP, in an optical module cage is available, and sense fast insertion and removal of the optical module. The detection apparatus may be a logic device, for example, may be a complex programmable logic device (CPLD), or may be a field programmable gate array (FPGA). Referring to FIG. 1, on one hand, the detection apparatus is connected to the CPU by using an I2C path; on the other hand, the detection apparatus is concurrently connected to the optical module cages by using I2C paths, that is, is connected to each optical module cage by using one I2C path. The detection apparatus can perform a concurrent probe on multiple optical module cages. Each I2C path includes two lines: a SDA line, which is also called an SDA path, and a SCL line, which is also called an SCL path. One end of an SDA line and one end of an SCL line of each I2C path are connected to a corresponding pin of the detection apparatus, and the other end of the SDA line and the other end of the SCL line are connected to a corresponding pin of an optical module cage. When performing a probe on an optical module cage, the detection apparatus occupies an I2C path corresponding to the optical module cage. In this case, system software (it may be understood that the system software is some instruction sets, inside the detection apparatus, for implementing an I2C function, for example, may be system software used for controlling the detection apparatus; or may be system software with a specific function, for example, software that is dedicated to determining an availability status of an optical module and a type of the optical module; and the like) cannot access (for example, accessing and acquiring information such as manufacturer information, power, and a voltage) an optical module in the optical module cage. Likewise, when the system software accesses an optical module cage, the detection apparatus cannot perform a probe on the optical module cage by using the I2C path corresponding to the optical module cage.

In this embodiment of the present disclosure, a conflict register is configured to store an occupancy status indicative of whether an I2C path of each optical module cage is occupied by system software, an SCL level register is configured to control a level status of an SCL path, an SDA level register is configured to control a level status of an SDA path, an SDA control register is configured to control an input/output status of the SDA path, and an availability register is configured to store a probe result. The conflict register, the SCL level register, the SDA level register, the SDA control register, and the availability register may be generally disposed inside the detection apparatus.

The detection apparatus shown in FIG. 1 and an optical module availability detection method implemented by the detection apparatus are described in detail below with reference to the accompanying drawings.

Figure 2:
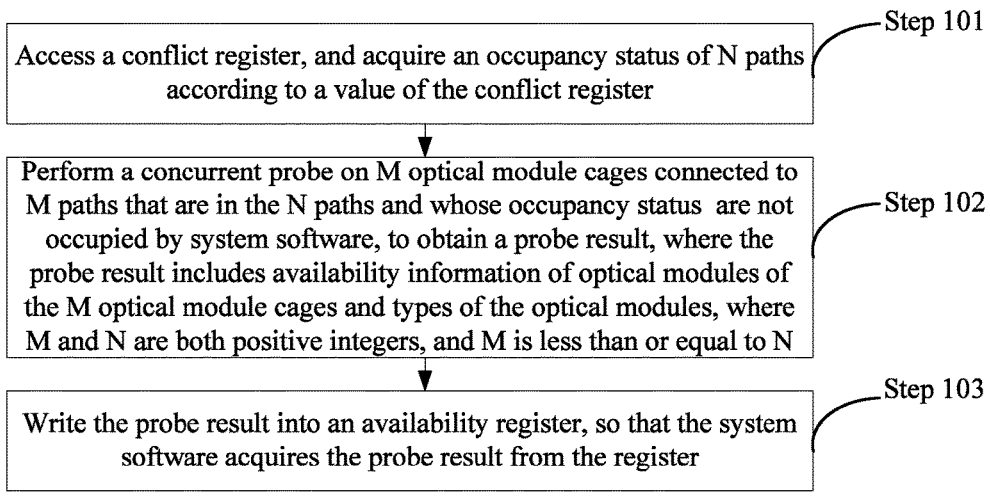
FIG. 2 is a schematic flowchart of an optical module availability detection method according to an embodiment of the present disclosure.

As shown in FIG. 2, an embodiment of the present disclosure provides an optical module availability detection method, which may be applied to a detection apparatus shown in FIG. 1, where the detection apparatus is concurrently connected to N optical module cages by using N paths, and the method includes:

Step 101: Access a conflict register, and acquire an occupancy status of the N paths according to a value of the conflict register.

Step 102: Perform a concurrent probe on M optical module cages connected to M paths that are in the N paths and whose occupancy status are not occupied by system software, to obtain a probe result, where the probe result includes availability information of optical modules of the M optical module cages and a type of the optical modules, where M and N are both positive integers, and M is less than or equal to N.

Step 103: Write the probe result into an availability register, so that the system software acquires the probe result from the register.

According to the optical module availability detection method provided in this embodiment of the present disclosure, a detection apparatus is concurrently connected to N optical module cages by using N paths; the detection apparatus accesses a conflict register, acquires, according to a value of the conflict register, an occupancy status of the N paths connected to the detection apparatus, then performs a concurrent probe on M optical module cages connected to M paths that are in the N paths and whose occupancy status are not occupied by system software, to obtain a probe result, where the probe result includes availability information of optical modules of the M optical module cages and a type of the optical modules, and finally, writes the probe result into an availability register, so that the system software can acquire the probe result from the register. The system software does not need to execute any other action, except reading the availability register, to acquire the probe result of the optical module cages on which the probe needs to be performed, and therefore, CPU usage is quite low. In addition, because the detection apparatus performs a concurrent probe on the M optical module cages, a probe time is quite short for each time and is much less than a time for fast insertion and removal operations. As a result, compared with a manner of using system software to perform polling in the prior art, in a case in which CPU usage is not increased, whether an optical module is available in an optical module cage can be monitored in real time and fast insertion and removal operations on the optical module can be sensed.

Figure 3:
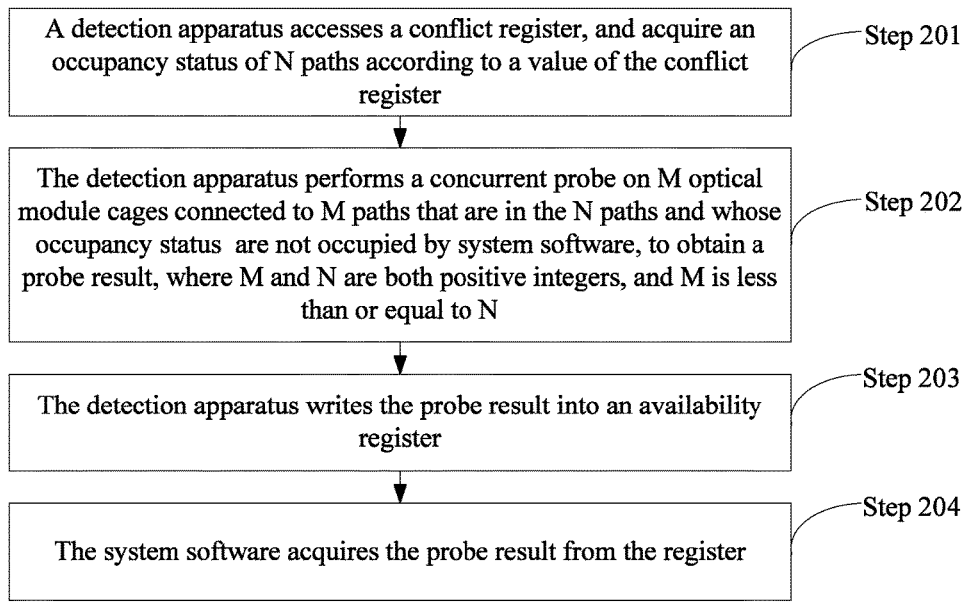
FIG. 3 is a schematic flowchart of another optical module availability detection method according to an embodiment of the present disclosure.

To make persons skilled in the art understand the technical solutions provided in the embodiments of the present disclosure more clearly, the following describes in detail, by using a specific embodiment, the optical module availability detection method provided in this embodiment of the present disclosure. The optical module availability detection method may be executed by a detection apparatus, where the detection apparatus may be the logic device described above; for a structure of the detection apparatus, refer to the foregoing descriptions, and details are not described again. As shown in FIG. 3, the method includes:

Step 201: A detection apparatus accesses a conflict register, and acquires an occupancy status of the N paths according to a value of the conflict register, where in this embodiment, the N paths may all be the foregoing I2C paths.

The register value of the conflict register may be used to indicate the occupancy status of the N paths. For example, if the conflict register is a 32-bit register, the value of the conflict register is 32 bits, and N is 32. Assuming that a current value of the conflict register is 0x00000001 in hexadecimal, the value is 00000000000000000000000000000001 after conversion to a binary value, and identifies occupancy statuses of 32 paths separately, with 0 representing not occupied and 1 representing occupied. Assuming that the 32 paths are paths 0 to 31, it can be seen from the foregoing value of the conflict register that, the paths 0 to 30 are not occupied, and the path 31 is occupied. A probe on the paths 0 to 30 that are not occupied can be performed; the path 31 is occupied by system software, and therefore, the path 31 should be skipped and not detected during detection. In addition, the paths herein are all the foregoing I2C paths, and for ease of description, all registers in the following embodiments are 32-bit registers by default.

In addition, it should be noted that, during a detection process, a logic device needs to access the conflict register only once; and a value of the conflict register reflects a status of all the paths regarding whether the paths are occupied by the system software, and therefore, the logic device cannot modify the value of the conflict register.

Step 202: The detection apparatus performs a concurrent probe on M optical module cages connected to M paths that are in the N paths and whose occupancy status are not occupied by system software, to obtain a probe result, where M and N are both positive integers, and M is less than or equal to N.

A probe on whether an optical module is available in an optical module cage may be implemented by performing a probe on a first preset address and a second preset address of the optical module, where the first preset address and the second preset address are commonly used I2C addresses of the optical module. For example, in this specification, the first preset address may be 0x50, and the second preset address may be 0x52. A result from performing a probe on 0x50 and a result from performing a probe on 0x52 need to be stored into an availability register corresponding to 0x50 and an availability register corresponding to 0x52, respectively.

Figure 5:
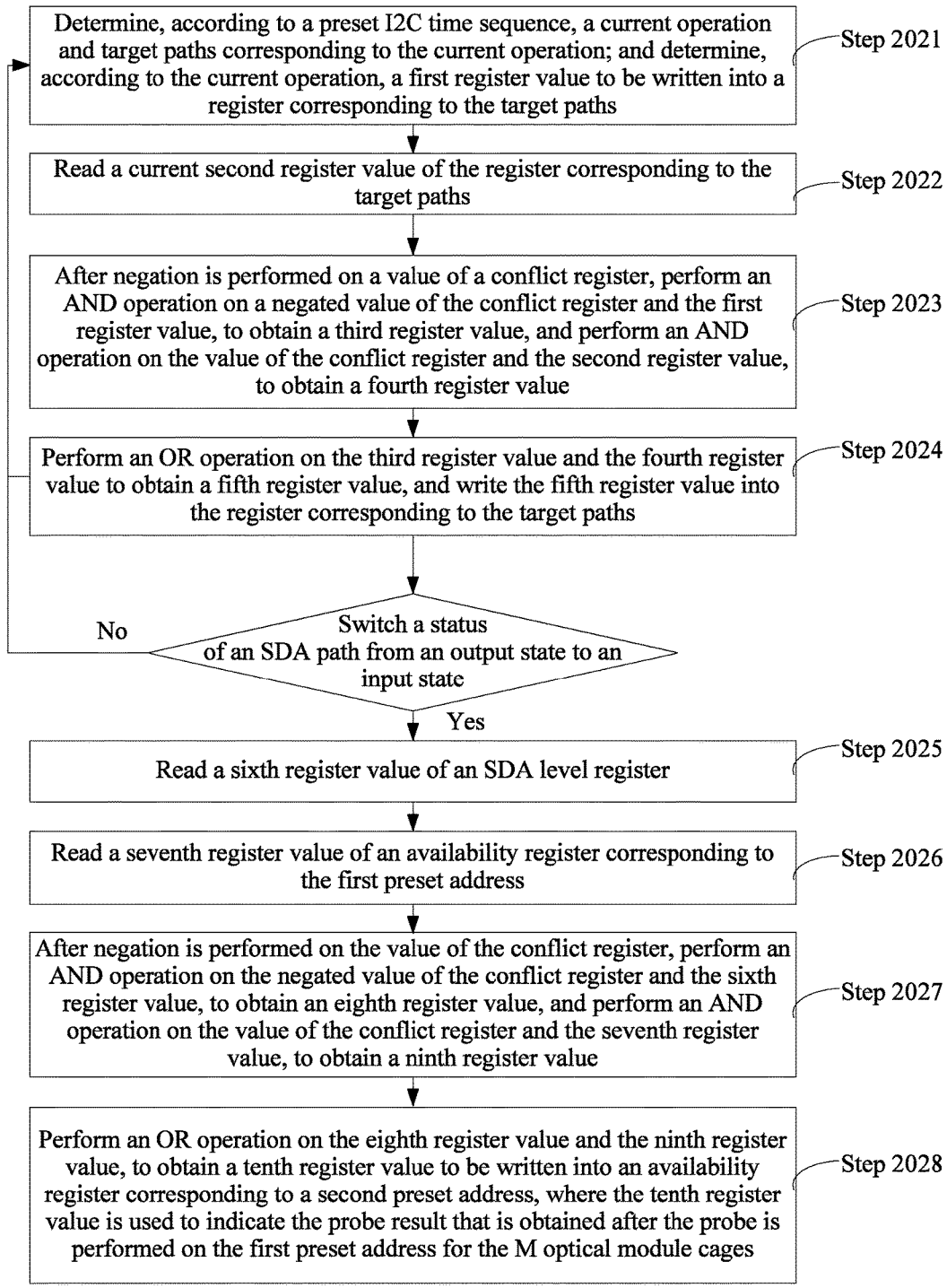
FIG. 5 is a schematic flowchart of a probe process in an optical module availability detection method according to an embodiment of the present disclosure.

The following is described first by using an example in which a concurrent probe is performed on the first preset address for the M optical module cages. As shown in FIG. 5, the following steps may be included:

Step 2021: Determine, according to a preset I2C time sequence, a current operation and target paths corresponding to the current operation; and determine, according to the current operation, a first register value to be written into a register corresponding to the target paths.

Figure 4:
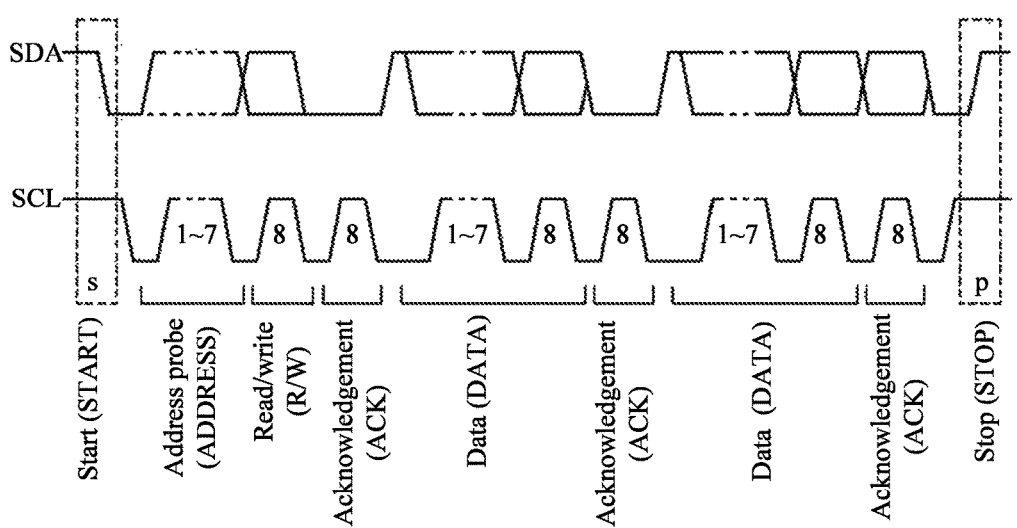
FIG. 4 is a diagram of an I2C time sequence according to an embodiment of the present disclosure.

A general I2C time sequence may be shown in FIG. 4. The preset I2C time sequence in this embodiment of the present disclosure is different from the time sequence shown in FIG. 4, and only a start time sequence (START), an address probe time sequence (ADDRESS) and a read/write time sequence (R/W), an acknowledgement time sequence (ACK) (only the first acknowledgement in FIG. 4), and a stop time sequence (STOP) that are shown in FIG. 4 are sequentially executed.

Several operations for an SDA path and an SCL path are included in each time sequence. In the preset I2C time sequence in this embodiment of the present disclosure, operations, target paths for operation, and operation sequences included in each time sequence are shown as follows:

Operations in the start time sequence sequentially include: setting a level of the SDA path to a high level, setting a level of the SCL path to a high level, setting a level of the SDA path to a low level, and setting a level of the SCL path to a low level; operations in the address probe time sequence and the read/write time sequence sequentially include: setting a level of the SDA path to a high level, repeatedly performing step i, step j and step k for I times, and setting a level of the SCL path to a low level, where I may be a preset value, for example, in the I2C protocol, it is specified that I may be 8; and step i, step j and step k are: step i: setting a level of the SCL path to a low level; step j: setting a level of the SDA path according to the first preset address or the second preset address, where steps 2021 to 2028 describe the probe on the first preset address for the M optical module cages, and therefore, a level of the SDA path needs to be set according to the first preset address when step j is executed for eight times. By using the address 0x50 as an example, a binary value corresponding to 0x50 is 01010000; left shift by one bit is performed on 01010000 to obtain 10100000, and the eight times of repeated execution of step j in the address probe time sequence and the read/write time sequence may be sequentially: setting a level of the SDA path to a high level, setting a level of the SDA path to a low level, setting a level of the SDA path to a high level, setting a level of the SDA path to a low level, setting a level of the SDA path to a low level, setting a level of the SDA path to a low level, setting a level of the SDA path to a low level, and setting a level of the SDA path to a low level. Similar to 0x50, for 0x52, a corresponding binary value is 01010010; 10100100 is obtained by performing left shift by one bit, and the eight times of repeated execution of step j in the address probe time sequence and the read/write time sequence may be sequentially: setting a level of the SDA path to a high level, setting a level of the SDA path to a low level, setting a level of the SDA path to a high level, setting a level of the SDA path to a low level, setting a level of the SDA path to a low level, setting a level of the SDA path to a high level, setting a level of the SDA path to a low level, and setting a level of the SDA path to a low level; step k: setting a level of the SCL path to a high level; operations in the acknowledgement time sequence sequentially include: setting a level of the SCL path to a high level, switching the SDA path to an input status, setting the availability register corresponding to the first preset address or the second preset address, setting a level of the SCL path to a low level, and switching the SDA path to an output status; and operations in the stop time sequence sequentially include: setting a level of the SDA path to a low level, setting a level of the SCL path to a high level, and setting a level of the SDA path to a high level.

The setting a level of the SCL path or a level of the SDA path to a high level refers to writing 1 into an SCL level register or an SDA level register, and the setting a level of the SCL path or a level of the SDA path to a low level refers to writing 0 into an SCL level register or an SDA level register.

Exemplarily, assuming that it is determined, according to a current time sequence, that a current operation to be executed is "setting a level of the SDA path to a high level" in the start time sequence, it is determined that the target paths are the SDA paths of the M paths, and a register corresponding to the target paths is an SDA level register; therefore, it may be determined that a first register value to be written into the SDA level register is 0xffffffff (equivalent to 11111111111111111111111111111111 in binary). Further, assuming that it is determined, according to a current time sequence, that a current operation to be executed is "setting a level of the SCL path to a low level" in the address probe time sequence and the read/write time sequence, it is determined that the target paths are the SCL paths of the M paths, and a register corresponding to the target paths is an SCL level register; therefore, it may be determined that a first register value to be written into the SCL level register is 0x00000000 (equivalent to 00000000000000000000000000000000 in binary). Alternatively, assuming that it is determined, according to a current time sequence, that a current operation to be executed is "switching the SDA path to an input status" in the acknowledgement time sequence, it is determined that the target paths are the SDA paths of the M paths; in this case, a register corresponding to the target paths is an SDA level register.

Step 2022: Read a current second register value of the register corresponding to the target paths.

As described in step 2021, if the target paths are the SDA paths of the M paths, the second register value needs to be read from an SDA level register; however, if the current operation is "switching the SDA path to an input status" or "switching the SDA path to an output status" in the acknowledgement time sequence, the second register value needs to be read from an SDA control register; if the target paths are the SCL paths of the M paths, the second register value needs to be read from an SCL level register.

Step 2023: After negation is performed on the value of the conflict register, perform an AND operation on a negated value of the conflict register and the first register value, to obtain a third register value, and perform an AND operation on the value of the conflict register and the second register value, to obtain a fourth register value.

Step 2024: Perform an OR operation on the third register value and the fourth register value to obtain a fifth register value, and write the fifth register value into the register corresponding to the target paths.

Step 2023 and step 2024 may be simply expressed by using the following formula:

$$D=((A\ \&\ \sim C)|(B\ \&\ C)), \tag{1}$$

where C represents the value of the conflict register, A is the first register value, B is the second register value, D represents the fifth register value to be stored into the register (that is, a register from which B is obtained, where it is equivalent to that a value of the register is updated from B to D) corresponding to the target paths after the operations.

In the foregoing steps, the first register value and the second register value are determined according to the operation "setting a level of the SDA path to a high level" in the start time sequence. After execution of step 2024 is complete, step 2021 to step 2024 need to be executed again according to the first register value and the second register value that are determined according to the operation "setting a level of the SCL path to a high level" in the start time sequence. By analogy, step 2021 to step 2024 are repeatedly executed according to execution sequences indicated by the preset I2C time sequence shown in step 2021 and execution sequences for operations in each time sequence, until the operation "switching the SDA path to an input status" in the acknowledgement time sequence is complete. Next, the following steps are executed:

Step 2025: Read a sixth register value of an SDA level register.

Step 2026: Read a seventh register value of an availability register corresponding to the first preset address.

There are two availability registers: one availability register corresponds to the first preset address, and the other availability register corresponds to the second preset address, for example, 0x50 corresponds to one availability register, and 0x52 corresponds to one availability register. If a probe on 0x50 is performed this time, the seventh register value needs to be read from the availability register corresponding to 0x50.

Step 2027: After negation is performed on the value of the conflict register, perform an AND operation on a negated value of the conflict register and the sixth register value, to obtain an eighth register value, and perform an AND operation on the value of the conflict register and the seventh register value, to obtain a ninth register value.

Step 2028: Perform an OR operation on the eighth register value and the ninth register value, to obtain a tenth register value to be written into the availability register corresponding to the first preset address, where the tenth register value is used to indicate the probe result that is obtained after the probe is performed on the first preset address for the M optical module cages.

Step 2027 and step 2028 may be simply expressed by using the following formula:

$$D = ((A \ \& \ {\sim}C) | (B \ \& \ C)), \quad (2)$$

where C represents the value of the conflict register, A is the sixth register value, B is the seventh register value, D represents the tenth register value to be stored into the availability register (that is, a register from which B is obtained, where it is equivalent to that a value of the register is updated from B to D) corresponding to the first preset address after the operations.

After step 2028, the operations "setting a level of the SCL path to a low level" and "switching the SDA path to an output status" in the acknowledgement time sequence and the operation in the stop time sequence still need to be sequentially executed according to the preset I2C time sequence. A process of the operations is exactly the same as that of steps 2021 to 2024, and details are not described again.

In conclusion, completion of the foregoing operations means completion of the probe performed on the first preset address for the M optical module cages, and subsequent execution steps may be divided into the following two manners:

A first manner: For any optical module cage in the M optical module cages, if it is determined, by probing, that an availability status of the first preset address is being unavailable, determining that no optical module is available in the any optical module cage, and skipping performing a probe on the second preset address for the optical module cage; or if it is determined, by probing, that an availability status of the first preset address is being available, continuing to perform a probe on the second preset address for the any optical module cage.

A second manner: Continuing to perform a probe on the second preset address for the any optical module cage, no matter whether an availability status of the first preset address, which is determined by probing, is being available or being unavailable, that is, performing a concurrent probe on the first preset address for the M optical module cages, and performing a concurrent probe on the second preset address for the M optical module cages.

For a process of continuing to perform a probe on the second preset address for the any optical module cage, a difference from a process of continuing to perform a probe on the first preset address for the any optical module cage lies in that the seventh register value is read from the availability register corresponding to the second preset address, and the obtained tenth register value is a tenth register value that needs to be written into the availability register corresponding to the second preset address; and the remaining steps are exactly the same as the step of continuing to perform a probe on the first preset address for the any optical module cage, and details are not described again.

Step 203: The detection apparatus writes the probe result into the availability register.

Corresponding to step 2028, the tenth register value that is obtained through the probe on the first preset address is written into the availability register corresponding to the first preset address, and the tenth register value that is obtained through the probe on the second preset address is written into the availability register corresponding to the second preset address. The value in the availability register corresponding to the first preset address and the value in the availability register corresponding to the second preset address are the probe result, and each bit in the values of the two availability registers can represent an availability status of the first preset address or the second preset address of the optical module cage corresponding to the bit. Availability information of an optical module of any optical module cage and a type of the optical module can be described according to an availability status of the first preset address and an availability status of the second preset address that are corresponding to the any optical module cage, where the availability information of the optical module includes that: an optical module is available, and no optical module is available; and the type of the optical module includes an optical module and a compact optical module.

Step 204: The system software acquires the probe result from the register.

Finally, the system software can learn, according to the value of the availability register corresponding to the first preset address and the value of the availability register corresponding to the second preset address, the probe result for the first preset address and the probe result for the second preset address that are of an optical module in each optical module cage, so as to determine whether an optical module is available in each optical module cage, where determining may be performed by using the following method: for any optical module, if it is determined, by probing, that an availability status of the first preset address is being unavailable, determining that no optical module is available in the any optical module cage; if it is determined, by probing, that an availability status of the first preset address is being available and an availability status of the second preset address is being unavailable, determining that an optical module is available in the any optical module cage; or if it is determined, by probing, that an availability status of the first preset address is being available and an availability status of the second preset address is being available, determining that a compact optical module is available in the any optical module cage.

In conclusion, each time of execution of steps 201 to 204 is a probe performed, by a logic device, on N optical module cages connected to the logic device. A probe is performed on multiple optical module cages simultaneously by using an I2C path, and a probe time is quite short for each time; only a part of a conventional I2C time sequence is executed, so that the probe time is further reduced and it generally takes less than 1 millisecond (ms) to perform a probe, and therefore, whether an optical module is available in an optical module cage can be monitored in real time. In addition, 1 ms is much less than a time for an administrator to perform fast insertion and removal operations, and therefore fast insertion and removal operations on the optical module can be identified. Further, system software does not need to execute any other action, except reading an availability register, to acquire a probe result of the optical module cages on which the probe needs to be performed, and therefore, CPU usage is quite low. As a result, compared with a manner of using system software to perform polling in the prior art, in the foregoing optical module availability detection method provided in this embodiment of the present disclosure, in a case in which CPU usage is not increased, whether an optical module is available in an optical module cage can be monitored in real time and fast insertion and removal operations on the optical module can be sensed.

Figure 6:
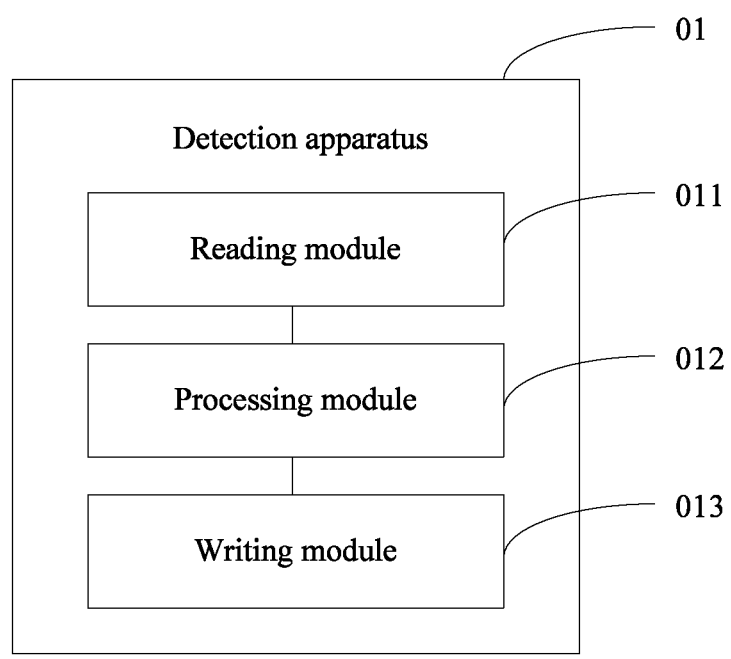
FIG. 6 is a schematic structural diagram of a detection apparatus according to an embodiment of the present disclosure.

An embodiment of the present disclosure further provides a detection apparatus 01. As shown in FIG. 6, the detection apparatus 01 is concurrently connected to N optical module cages by using N paths, and the detection apparatus 01 includes: a reading module 011 configured to: access a conflict register, and acquire an occupancy status of the N paths according to a value of the conflict register; a processing module 012 configured to perform a concurrent probe on M optical module cages connected to M paths that are in the N paths and whose occupancy status are not occupied by system software, to obtain a probe result, where the probe result includes availability information of optical modules of the M optical module cages and a type of the optical modules, where M and N are both positive integers, and M is less than or equal to N; and a writing module 013 configured to write the probe result into an availability register, so that the system software acquires the probe result from the register.

Optionally, the processing module 012 may be configured to: perform a concurrent probe on a first preset address for the M optical module cages, where for any optical module cage in the M optical module cages, if it is determined, by probing, that no optical module is available in the first preset address, it is determined that no optical module is available in the first optical module cage; if it is determined, by probing, that an optical module is available in the first preset address, a probe is performed on a second preset address for the any optical module cage; and if it is determined, by probing, that no optical module is available in the second preset address, it is determined that an optical module is available in the any optical module cage; if it is determined, by probing, that an optical module is available in the second preset address, it is determined that a compact optical module is available in the first optical module cage.

Optionally, the processing module 012 may be configured to: perform a concurrent probe on a first preset address for the M optical module cages, and perform a concurrent probe on a second preset address for the M optical module cages, where for any optical module cage in the M optical module cages, if it is determined, by probing, that no optical module is available in the first preset address, it is determined that no optical module is available in the any optical module cage; if it is determined, by probing, that an optical module is available in the first preset address and no optical module is available in the second preset address, it is determined that an optical module is available in the any optical module; and if it is determined, by probing, that an optical module is available in the first preset address and an optical module is available in the second preset address, it is determined that a compact optical module is available in the any optical module.

Optionally, the N paths are N I2C paths, each I2C path includes a SCL path and a SDA path, the SCL path is controlled by an SCL level register, and the SDA path is controlled by an SDA level register and an SDA control register; and the processing module 012 may be configured to:

a. determine, according to a preset I2C time sequence, a current operation and target paths corresponding to the current operation; and determine, according to the current operation, a first register value to be written into a register corresponding to the target paths;

b. read a current second register value of the register corresponding to the target paths;

c. after negation is performed on the value of the conflict register, perform an AND operation on a negated value of the conflict register and the first register value, to obtain a third register value, and perform an AND operation on the value of the conflict register and the second register value, to obtain a fourth register value;

d. performing an OR operation on the third register value and the fourth register value to obtain a fifth register value, and writing the fifth register value into the register corresponding to the target paths, wherein the target paths are SCL paths of the M paths or SDA paths of the M paths; if the target paths are the SCL paths of the M paths, the register corresponding to the target paths is the SCL level register; if the target paths are the SDA paths of the M paths, the register corresponding to the target paths is the SDA level register or the SDA control register; and repeatedly performing step a, step b, step c and step d according to the preset I2C time sequence until statuses of the SDA paths of the M paths are switched from output to input;

e. read a sixth register value of the SDA level register;

f. read a seventh register value of an availability register corresponding to the first preset address;

g. after negation is performed on the value of the conflict register, perform an AND operation on the negated value of the conflict register and the sixth register value, to obtain an eighth register value, and perform an AND operation on the value of the conflict register and the seventh register value, to obtain a ninth register value; and h. perform an OR operation on the eighth register value and the ninth register value, to obtain a tenth register value to be written into the availability register corresponding to the first preset address, where the tenth register value is used to indicate the probe result that is obtained after the probe is performed on the first preset address for the M optical module cages.

Optionally, the processing module may be further configured to (it should be noted that, a first register value to a tenth register value in the following steps are different from the first register value to the tenth register value that are in the foregoing probe process performed on the first preset address):

a. determine, according to a preset I2C time sequence, a current operation and target paths corresponding to the current operation; and determine, according to the current operation, a first register value to be written into a register corresponding to the target paths;

b. read a current second register value of the register corresponding to the target paths;

c. after negation is performed on the value of the conflict register, perform an AND operation on a negated value of the conflict register and the first register value, to obtain a third register value, and perform an AND operation on the value of the conflict register and the second register value, to obtain a fourth register value;

d. performing an OR operation on the third register value and the fourth register value to obtain a fifth register value, and writing the fifth register value into the register corresponding to the target paths, wherein the target paths are SCL paths of the M paths or SDA paths of the M paths; if the target paths are the SCL paths of the M paths, the register corresponding to the target paths is the SCL level register; if the target paths are the SDA paths of the M paths, the register corresponding to the target paths is the SDA level register or the SDA control register; and repeatedly performing step a, step b, step c and step d according to the preset I2C time sequence until statuses of the SDA paths of the M paths are switched from output to input;

e. read a sixth register value of the SDA level register;

f. read a seventh register value of an availability register corresponding to the second preset address;

g. after negation is performed on the value of the conflict register, perform an AND operation on the negated value of the conflict register and the sixth register value, to obtain an eighth register value, and perform an AND operation on the value of the conflict register and the seventh register value, to obtain a ninth register value; and h. perform an OR operation on the eighth register value and the ninth register value, to obtain a tenth register value to be written into the availability register corresponding to the second preset address, where the tenth register value is used to indicate the probe result that is obtained after the probe is performed on the second preset address for the M optical module cages.

Optionally, the preset I2C time sequence sequentially includes: a start time sequence, an address probe time sequence and a read/write time sequence, an acknowledgement time sequence, and a stop time sequence, where:

operations in the start time sequence sequentially include: setting a level of the SDA path to a high level, setting a level of the SCL path to a high level, setting a level of the SDA path to a low level, and setting a level of the SCL path to a low level;

operations in the address probe time sequence and the read/write time sequence sequentially include: setting a level of the SDA path to a high level, repeatedly performing step i, step j and step k for I times, and setting a level of the SCL path to a low level, where I is a preset value, and step i, step j and step k are:

step i: setting a level of the SCL path to a low level;

step j: setting a level of the SDA path according to the first preset address or the second preset address; and step k: setting a level of the SCL path to a high level;

operations in the acknowledgement time sequence sequentially include: setting a level of the SCL path to a high level, switching the SDA path to an input status, setting the availability register corresponding to the first preset address or the second preset address, setting a level of the SCL path to a low level, and switching the SDA path to an output status; and operations in the stop time sequence sequentially include: setting a level of the SDA path to a low level, setting a level of the SCL path to a high level, and setting a level of the SDA path to a high level.

This embodiment is used to implement the foregoing method embodiments. For the working procedures and working principles of modules in this embodiment, reference may be made to the descriptions of the foregoing method embodiments, and details are not described herein again.

In conclusion, the detection apparatus provided in this embodiment of the present disclosure is concurrently connected to N optical module cages by using N paths; the detection apparatus accesses a conflict register, acquires, according to a value of the conflict register, an occupancy status of the N paths connected to the detection apparatus, then performs a probe on M optical module cages connected to M paths that are in the N paths and whose occupancy status are not occupied by system software, to obtain a probe result, where the probe result is used to describe availability information of optical modules of the M optical module cages and a type of the optical modules, and finally, writes the probe result into an availability register, so that the system software can acquire the probe result from the register. The system software does not need to execute any other action, except reading the availability register, to acquire the probe result of the optical module cages on which the probe needs to be performed, and therefore, CPU usage is quite low. In addition, because the detection apparatus performs a concurrent probe on the M optical module cages, a probe time is quite short for each time and is much less than a time for fast insertion and removal operations. As a result, compared with a manner of using system software to perform polling in the prior art, in a case in which CPU usage is not increased, whether an optical module is available in an optical module cage can be monitored in real time and fast insertion and removal operations on the optical module can be sensed.

Figure 7:
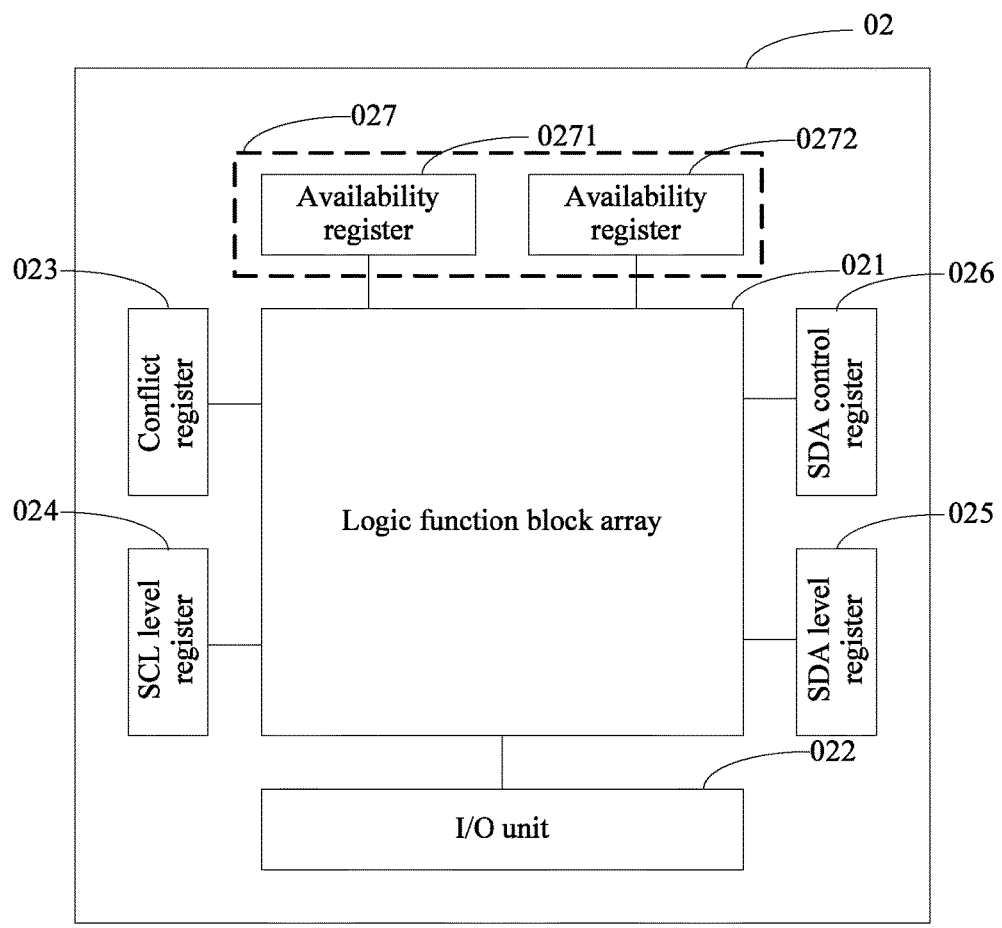
FIG. 7 is a schematic structural diagram of another detection apparatus according to an embodiment of the present disclosure.

An embodiment of the present disclosure further provides a detection apparatus 02. The detection apparatus 02 is concurrently connected to N optical module cages by using N paths, and a connection relationship between the detection apparatus 02 and the N optical module cages may be a connection relationship, shown in FIG. 1, between a detection apparatus and N optical module cages, and details are not described herein again. The detection apparatus 02 may be a logic device. As shown in FIG. 7, the detection apparatus 02 includes a logic function block array 021, an input/output (I/O) unit 022, a conflict register 023, an SCL level register 024, an SDA level register 025, an SDA control register 026, and an availability register 027, where the logic function block array 021 includes multiple logic function blocks. The logic function block array 021 is interconnected with the conflict register 023, the SCL level register 024, the SDA level register 025, the SDA control register 026, the availability register 027, and the I/O unit 022 by cabling. By controlling the I/O unit 022, the logic function block array 021 is configured to:

access the conflict register 023, and acquire an occupancy status of the N paths according to a value of the conflict register 023;

perform a concurrent probe on M optical module cages connected to M paths that are in the N paths and whose occupancy status are not occupied by system software, to obtain a probe result, where the probe result includes availability information of optical modules of the M optical module cages and a type of the optical modules, where M and N are both positive integers, and M is less than or equal to N; and write the probe result into the availability register 027, so that the system software acquires the probe result from the register 027, where the availability register 027 includes two registers, which are an availability register 0271 corresponding to a first preset address and an availability register 0272 corresponding to a second preset address, where the first preset address may be 0x50, and the second preset address may be 0x52.

Optionally, in an implementation manner, by controlling the I/O unit 022, the logic function block array 021 is configured to:

perform a concurrent probe on a first preset address for the M optical module cages, where for any optical module cage in the M optical module cages, if it is determined, by probing, that an availability status of the first preset address is being unavailable, it is determined that no optical module is available in the any optical module cage; if it is determined, by probing, that an availability status of the first preset address is being available, a probe is performed on a second preset address for the any optical module cage; and if it is determined, by probing, that an availability status of the second preset address is being unavailable, it is determined that an optical module is available in the any optical module cage; if it is determined, by probing, that an availability status of the second preset address is being available, it is determined that a compact optical module is available in the first optical module cage.

Optionally, in another implementation manner, by controlling the I/O unit 022, the logic function block array 021 may be configured to:

perform a concurrent probe on a first preset address for the M optical module cages, and perform a concurrent probe on a second preset address for the M optical module cages, where for any optical module cage in the M optical module cages, if it is determined, by probing, that an availability status of the first preset address is being unavailable, it is determined that no optical module is available in the any optical module cage; if it is determined, by probing, that an availability status of the first preset address is being available and an availability status of the second preset address is being unavailable, it is determined that an optical module is available in the any optical module cage; and if it is determined, by probing, that an availability status of the first preset address is being available and an availability status of the second preset address is being available, it is determined that a compact optical module is available in the any optical module cage.

Optionally, the N paths are N I2C paths, each I2C path includes a SCL path and a SDA path, the SCL path is controlled by the SCL level register 024, and the SDA path is controlled by the SDA level register 025 and the SDA control register 026; and by controlling the I/O unit 022, the logic function block array 021 may be configured to:

a. determine, according to a preset I2C time sequence, a current operation and target paths corresponding to the current operation; and determine, according to the current operation, a first register value to be written into a register corresponding to the target paths;

b. read a current second register value of the register corresponding to the target paths;

c. after negation is performed on the value of the conflict register 023, perform an AND operation on a negated value of the conflict register 023 and the first register value, to obtain a third register value, and perform an AND operation on the value of the conflict register 023 and the second register value, to obtain a fourth register value;

d. perform an OR operation on the third register value and the fourth register value to obtain a fifth register value, and write the fifth register value into the register corresponding to the target paths, where the target paths are the SCL paths of the M paths or the SDA paths of the M paths; if the target paths are the SCL paths of the M paths, the register corresponding to the target paths is the SCL level register 024; if the target paths are the SDA paths of the M paths, the register corresponding to the target paths is the SDA level register 025 or the SDA control register 026; and repeatedly perform step a, step b, step c and step d according to the preset I2C time sequence until a status of the SDA paths of the M paths is switched from an output status to an input status;

e. read a sixth register value of the SDA level register 025;

f. read a seventh register value of the availability register 0271 corresponding to the first preset address;

g. after negation is performed on the value of the conflict register 023, perform an AND operation on the negated value of the conflict register 023 and the sixth register value, to obtain an eighth register value, and perform an AND operation on the value of the conflict register 023 and the seventh register value, to obtain a ninth register value; and h. perform an OR operation on the eighth register value and the ninth register value, to obtain a tenth register value to be written into the availability register 0271 corresponding to the first preset address, where the tenth register value is used to indicate the probe result that is obtained after the probe is performed on the first preset address for the M optical module cages.

Optionally, by controlling the I/O unit 022, the logic function block array 021 may be further configured to (it should be noted that, a first register value to a tenth register value in the following steps are different from the first register value to the tenth register value that are in the foregoing probe process performed on the first preset address):

a. determine, according to a preset I2C time sequence, a current operation and target paths corresponding to the current operation; and determine, according to the current operation, a first register value to be written into a register corresponding to the target paths;

b. read a current second register value of the register corresponding to the target paths;

c. after negation is performed on the value of the conflict register 023, perform an AND operation on the negated value of the conflict register 023 and the first register value, to obtain a third register value, and perform an AND operation on the value of the conflict register 023 and the second register value, to obtain a fourth register value;

d. perform an OR operation on the third register value and the fourth register value to obtain a fifth register value, and write the fifth register value into the register corresponding to the target paths, where the target paths are the SCL paths of the M paths or the SDA paths of the M paths; if the target paths are the SCL paths of the M paths, the register corresponding to the target paths is the SCL level register 024; if the target paths are the SDA paths of the M paths, the register corresponding to the target paths is the SDA level register 025 or the SDA control register 026; and repeatedly perform step a, step b, step c and step d according to the preset I2C time sequence until a status of the SDA paths of the M paths is switched from an output status to an input status;

e. read a sixth register value of the SDA level register 025;

f. read a seventh register value of the availability register 0272 corresponding to the second preset address;

g. after negation is performed on the value of the conflict register 023, perform an AND operation on the negated value of the conflict register 023 and the sixth register value, to obtain an eighth register value, and perform an AND operation on the value of the conflict register 023 and the seventh register value, to obtain a ninth register value; and h. perform an OR operation on the eighth register value and the ninth register value, to obtain a tenth register value to be written into the availability register 0272 corresponding to the second preset address, where the tenth register value is used to indicate the probe result that is obtained after the probe is performed on the second preset address for the M optical module cages.

Optionally, the preset I2C time sequence sequentially includes: a start time sequence, an address probe time sequence and a read/write time sequence, an acknowledgement time sequence, and a stop time sequence, where:

operations in the start time sequence sequentially include: setting a level of the SDA path to a high level, setting a level of the SCL path to a high level, setting a level of the SDA path to a low level, and setting a level of the SCL path to a low level;

operations in the address probe time sequence and the read/write time sequence sequentially include: setting a level of the SDA path to a high level, repeatedly performing step i, step j and step k for I times, and setting a level of the SCL path to a low level, where I is a preset value, and step i, step j and step k are:

step i: setting a level of the SCL path to a low level;

step j: setting a level of the SDA path according to the first preset address or the second preset address; and step k: setting a level of the SCL path to a high level;

operations in the acknowledgement time sequence sequentially include: setting a level of the SCL path to a high level, switching the SDA path to an input status, setting the availability register corresponding to the first preset address or the second preset address, setting a level of the SCL path to a low level, and switching the SDA path to an output status; and operations in the stop time sequence sequentially include: setting a level of the SDA path to a low level, setting a level of the SCL path to a high level, and setting a level of the SDA path to a high level.

In addition, the detection apparatus in this embodiment may be the foregoing logic device, where the logic device may be a CPLD or an FPGA. If the logic device is a CPLD, the logic function block array 021 may be an array that includes a function block (FB); if the logic device is an FPGA, the logic function block array 021 may be an array that includes a configurable logic block (CLB). Further, there may be multiple I/O units, which may be distributed around the logic function block array 021 and may serve as an interface between the logic function block array 021 and an external package pin.

This embodiment is used to implement the foregoing method embodiments. For the working procedures and working principles of modules in this embodiment, reference may be made to the descriptions of the foregoing method embodiments, and details are not described herein again.

In conclusion, the detection apparatus provided in this embodiment of the present disclosure is concurrently connected to N optical module cages by using N paths; the detection apparatus accesses a conflict register, acquires, according to a value of the conflict register, an occupancy status of the N paths connected to the detection apparatus, then performs a probe on M optical module cages connected to M paths that are in the N paths and whose occupancy status are not occupied by system software, to obtain a probe result, where the probe result is used to describe availability information of optical modules of the M optical module cages and a type of the optical modules, and finally, writes the probe result into an availability register, so that the system software can acquire the probe result from the register. The system software does not need to execute any other action, except reading the availability register, to acquire the probe result of the optical module cages on which the probe needs to be performed, and therefore, CPU usage is quite low. In addition, because the detection apparatus performs a concurrent probe on the M optical module cages, a probe time is quite short for each time and is much less than a time for fast insertion and removal operations. As a result, compared with a manner of using system software to perform polling in the prior art, in a case in which CPU usage is not increased, whether an optical module is available in an optical module cage can be monitored in real time and fast insertion and removal operations on the optical module can be sensed.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit of a system.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device or the like) or a processor to perform some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as these modifications or replacements do not cause the essence of the corresponding technical solutions to depart from the scope of the technical solutions of the embodiments of the present disclosure.

The invention claimed is:

1. An optical module availability detection method executed in a detection apparatus, wherein the detection apparatus is configured to be concurrently coupled to N optical module cages using N paths, and wherein the method comprises:
  accessing a conflict register;
  acquiring an occupancy status of the N paths according to a conflict register value;
  performing a concurrent probe on M optical module cages coupled to M paths that are in the N paths and whose occupancy status are not occupied by a system software to obtain a probe result, wherein the probe result comprises availability information of optical modules of the M optical module cages and a type of the optical modules, wherein M and N are both positive integers, and wherein M is less than or equal to N; and
  writing the probe result into an availability register.

2. The method according to claim 1, wherein performing the concurrent probe on the M optical module cages coupled to the M paths that are in the N paths and whose occupancy status are not occupied by the system software to obtain the probe result comprises:
  performing a concurrent probe on a first preset address for the M optical module cages;
  determining that no optical module is available in the M optical module cages when, for any of the M optical module cages, an availability status of the first preset address is unavailable;
  performing a probe on a second preset address for any of the M optical module cages when an availability status of the first preset address is available;
  determining that one of the optical modules is available in the M optical module cages when an availability status of the second preset address is unavailable; and
  determining that a compact optical module is available in the M optical module cages when an availability status of the second preset address is available.

3. The method according to claim 2, wherein the N paths are N inter-integrated circuit (I2C) paths, wherein each I2C path comprises a serial clock (SCL) path and a serial data (SDA) path, wherein the SCL path is controlled by an SCL level register, wherein the SDA path is controlled by an SDA level register and an SDA control register, and wherein performing the concurrent probe on the first preset address for the M optical module cages comprises:
  a. determining, according to a preset I2C time sequence, a current operation and target paths corresponding to the current operation; and determining, according to the current operation, a first register value to be written into a register corresponding to the target paths;
  b. reading a second register value of the register corresponding to the target paths;
  c. performing an AND operation on a negated conflict register value and the first register value to obtain a third register value after negation is performed on the conflict register value; and performing an AND operation on the conflict register value and the second register value to obtain a fourth register value;
  d. performing an OR operation on the third register value and the fourth register value to obtain a fifth register value; and writing the fifth register value into the register corresponding to the target paths, wherein the target paths are SCL paths of the M paths or SDA paths of the M paths, wherein the register corresponding to the target paths is the SCL level register when the target paths are the SCL paths of the M paths, and wherein the register corresponding to the target paths is the SDA level register or the SDA control register when the target paths are the SDA paths of the M paths;
  performing step a, step b, step c, and step d repeatedly according to the preset I2C time sequence until statuses of the SDA paths of the M paths are switched from output to input;
  e. reading a sixth register value of the SDA level register;
  f. reading a seventh register value of an availability register corresponding to the first preset address;
  g. performing an AND operation on the negated conflict register value and the sixth register value to obtain an eighth register value after negation is performed on the conflict register value; and performing an AND operation on the conflict register value and the seventh register value to obtain a ninth register value; and
  h. performing an OR operation on the eighth register value and the ninth register value to obtain a tenth register value to be written into the availability register corresponding to the first preset address, wherein the tenth register value is used to indicate the probe result that is obtained after the concurrent probe is performed on the first preset address for the M optical module cages.

4. The method according to claim 3, wherein the preset I2C time sequence sequentially comprises:
  a start time sequence;
  an address probe time sequence and a read/write time sequence;
  an acknowledgement time sequence; and
  a stop time sequence,
  wherein operations in the start time sequence sequentially comprise:
    setting a SDA path level to high;
    setting a SCL path level to high;
    setting the SDA path level to low; and
    setting the SCL path level to low,
  wherein operations in the address probe time sequence and the read/write time sequence sequentially comprise:
    setting the SDA path level to high;
    performing step i, step j, and step k repeatedly for I times; and
    setting the SCL path level to low,
  wherein I is a preset value,
  wherein step i, step j, and step k comprise:
    step i: setting the SCL, path level to low;
    step j: setting the SDA level path according to the first preset address or the second preset address; and
    step k: setting the SCL path level to high, wherein operations in the acknowledgement time sequence sequentially comprise:
setting the SCL path level to high;
switching the SDA path to an input status;
setting the availability register corresponding to the first preset address or the second preset address;
setting the SCL path level to low; and
switching the SDA path to an output status, and
wherein operations in the stop time sequence sequentially comprise:
setting the SDA path level to low;
setting the SCL path level to high; and
setting the SDA path level to high.

5. The method according to claim 1, wherein performing the concurrent probe on the M optical module cages coupled to the M paths that are in the N paths and whose occupancy status are not occupied by the system software to obtain the probe result comprises:
performing a concurrent probe on a first preset address for the M optical module cages; and
performing a probe on a second preset address for the M optical module cages,
wherein, for any of the M optical module cages, no optical module is available in the M optical module cages when an availability status of the first preset address is unavailable,
wherein one of the optical modules is available in the M optical module, cages, when an availability status of the first preset address is available and an availability status of the second preset address is unavailable, and
wherein a compact optical module is available in the M optical module cages when an availability status of the first preset address is available and an availability status of the second preset address is available.

6. The method according to claim 5, wherein the N paths are N inter-integrated circuit (I2C) paths, wherein each I2C path comprises a serial clock (SCL) path and a serial data (SDA) path, wherein the SCL path is controlled by an SCL level register, wherein the SDA path is controlled by an SDA level register and an SDA control register; and wherein performing the concurrent probe on the first preset address for the M optical module cages comprises:
a. determining, according to a preset I2C time sequence, a current operation and target paths corresponding to the current operation; and determining, according to the current operation, a first register value to be written into a register corresponding to the target paths;
b. reading a second register value of the register corresponding to the target paths;
c. performing an AND operation on a negated conflict register value and the first register value to obtain a third register value after negation is performed on the conflict register value; and performing an AND operation on the conflict register value and the second register value to obtain a fourth register value;
d. performing an OR operation on the third register value and the fourth register value to obtain a fifth register value; and writing the fifth register value into the register corresponding to the target paths, wherein the target paths are SCL paths of the M paths or SDA paths of the M paths, wherein the register corresponding to the target paths is the SCL level register when the target paths are the SCL, paths of the M paths, and wherein the register corresponding to the target paths is the SDA level register or the SDA control register when the target paths are the SDA paths of the M paths;

performing step a, step b, step c, and step d repeatedly according to the preset I2C time sequence until statuses of the SDA paths of the M paths are switched from output to input;
e. reading a sixth register value of the SDA level register;
f. reading a seventh register value of an availability register corresponding to the first preset address;
g. performing an AND operation on the negated conflict register value and the sixth register value to obtain an eighth register value after negation is performed on the conflict register value; and performing an AND operation on the conflict register value and the seventh register value to obtain a ninth register value; and
h. performing an OR operation on the eighth register value and the ninth register value to obtain a tenth register value to be written into the availability register corresponding to the second preset address, wherein the tenth register value is used to indicate the probe result that is obtained after the probe is performed on the second preset address for the M optical module cages.

7. The method according to claim 5, wherein the N paths are N inter-integrated circuit (I2C) paths, wherein each I2C path comprises a serial clock (SCL) path and a serial data (SDA) path, wherein the SCL path is controlled by an SCL level register, wherein the SDA path is controlled by an SDA level register and an SDA control register, and wherein performing the probe on the second preset address for the M optical module cages comprises:
a. determining, according to a preset I2C time sequence, a current operation and target paths corresponding to the current operation; and determining, according to the current operation, a first register value to be written into a register corresponding to the target paths;
b. reading a second register value of the register corresponding to the target paths;
c. performing an AND operation on a negated conflict register value and the first register value to obtain a third register value after negation is performed on the conflict register value; and performing an AND operation on the conflict register value and the second register value to obtain a fourth register value;
d. performing an OR operation on the third register value and the fourth register value to obtain a fifth register value; and writing the fifth register value into the register corresponding to the target paths, wherein the target paths are SCL paths of the M paths or SDA paths of the M paths, wherein the register corresponding to the target paths is the SCL level register when the target paths are the SCL paths of the M paths, and wherein the register corresponding to the target paths is the SDA level register or the SDA control register when the target paths are the SDA paths of the M paths;
performing step a, step b, step c, and step d repeatedly according to the preset I2C time sequence until statuses of the SDA paths of the M paths are switched from output to input;
e. reading a sixth register value of the SDA level register;
f. reading a seventh register value of an availability register corresponding to the second preset address;
g. performing an AND operation on the negated conflict register value and the sixth register value to obtain an eighth register value after negation is performed on the conflict register value; and performing an AND operation on the conflict register value and the seventh register value to obtain a ninth register value; and
h. performing an OR operation on the eighth register value and the ninth register value to obtain a tenth register value to be written into the availability register corresponding to the second preset address, wherein the tenth register value is used to indicate the probe result that is obtained after the probe is performed on the second preset address for the M optical module cages.

8. The method according to claim 7, wherein the preset I2C time sequence sequentially comprises:
   a start time sequence;
   an address probe time sequence and a read/write time sequence;
   an acknowledgement time sequence; and
   a stop time sequence,
   wherein operations in the start time sequence sequentially comprise:
     setting a SDA path level to high;
     setting a SCL path level to high;
     setting the SDA path level to low; and
     setting the SCL path level to low,
   wherein operations in the address probe time sequence and the read/write time sequence sequentially comprise:
     setting the SDA path level to high;
     performing step i, step j, and step k repeatedly for I times; and
     setting the SCL, path level to low,
   wherein I is a preset value,
   wherein step i, step j, and step k comprise:
     step i: setting the SCL path level to low;
     step j: setting the SDA path level according to the first preset address or the second preset address; and
     step k: setting the SCL path level to high,
   wherein operations in the acknowledgement time sequence sequentially comprise:
     setting the SCL path level to high;
     switching the SDA path to an input status;
     setting the availability register corresponding to the first preset address or the second preset address;
     setting the SCL path level to low; and
     switching the SDA path to an output status, and
   wherein operations in the stop time sequence sequentially comprise:
     setting the SDA path level to low;
     setting the SCL path level to high; and
     setting the SDA path level to high.

9. A detection apparatus configured to concurrently couple to N optical module cages using N paths, wherein the detection apparatus comprises:
   a memory comprising instructions; and
   a processor coupled to the memory and configured to execute the instructions to:
     access a conflict register;
     acquire an occupancy status of the N paths according to a conflict register value;
     perform a concurrent probe on M optical module cages coupled to M paths that are in the N paths and whose occupancy status are not occupied by a system software to obtain a probe result, wherein the probe result comprises availability information of a plurality of optical modules of the M optical module cages and a type of the optical modules, wherein M and N are both positive integers, and wherein M is less than or equal to N; and
     write the probe result into an availability register.

10. The detection apparatus according to claim 9, wherein the processor being configured to perform the concurrent probe on the M optical module cages coupled to the M paths that are in the N paths and whose occupancy status are not occupied by the system software to obtain the probe result comprises the processor being configured to:
   perform a concurrent probe on a first preset address for the M optical module cages;
   determine that no optical module is available in a first optical module cage of the M optical module cages when, for any of the M optical module cages, no optical module is available in the first preset address;
   perform a probe on a second preset address for any of the M optical module cages when one of the optical modules is available in the first preset address;
   determine that one of the optical modules is available in the M optical module cages when no optical module is available in the second preset address; and
   determine that a compact optical module is available in the first optical module cage when one of the optical modules is available in the second preset address.

11. The detection apparatus according to claim 10, wherein the N paths are N inter-integrated circuit (I2C) paths, wherein each I2C path comprises a serial clock (SCL) path and a serial data (SDA) path, wherein the SCL path is controlled by an SCL level register, wherein the SDA path is controlled by an SDA level register and an SDA control register, and wherein the processor is further configured to:
   a. determine, according to a preset I2C time sequence, a current operation and target paths corresponding to the current operation; and determine, according to the current operation, a first register value to be written into a register corresponding to the target paths;
   b. read a second register value of the register corresponding to the target paths;
   c. perform an AND operation on a negated conflict register value and the first register value to obtain a third register value after negation is performed on the conflict register value; and perform an AND operation on the conflict register value and the second register value to obtain a fourth register value;
   d. perform an OR operation on the third register value and the fourth register value to obtain a fifth register value; and write the fifth register value into the register corresponding to the target paths, wherein the target paths are SCL paths of the M paths or SDA paths of the M paths, wherein the register corresponding to the target paths is the SCL level register when the target paths are the SCL paths of the M paths, and wherein the register corresponding to the target paths is the SDA level register or the SDA control register when the target paths are the SDA paths of the M paths;
   perform step a, step b, step c, and step d repeatedly according to the preset I2C time sequence until statuses of the SDA paths of the M paths are switched from output to input;
   f. read a seventh register value of an availability register corresponding to the first preset address;
   g. perform an AND operation on the negated conflict register value and a sixth register value to obtain an eighth register value after negation is performed on the conflict register value; and perform an AND operation on the conflict register value and the seventh register value to obtain a ninth register value; and
   h. perform an OR operation on the eighth register value and the ninth register value to obtain a tenth register value to be written into the availability register corresponding to the first preset address, wherein the tenth register value is used to indicate the probe result that is obtained after the concurrent probe is performed on the first preset address for the M optical module cages.

12. The detection apparatus according to claim 11, wherein the preset I2C time sequence sequentially comprises:
   a start time sequence;
   an address probe time sequence and a read/write time sequence;
   an acknowledgement time sequence; and
   a stop time sequence,
   wherein operations in the start time sequence sequentially comprise:
      setting a SDA path level to high;
      setting a SCL path level to high;
      setting the SDA path level to low; and
      setting the SCL path level to low,
   wherein operations in the address probe time sequence and the read/write time sequence sequentially comprise:
      setting the SDA path level to high;
      performing step i, step j, and step k repeatedly for I times; and
      setting the SCL path level to low,
   wherein I is a preset value,
   wherein step i, step j, and step k comprise:
      step i: setting the SCL path level to low;
      step j: setting the SDA path level according to the first preset address or the second preset address; and
      step k: setting the SCL path level to high,
   wherein operations in the acknowledgement time sequence sequentially comprise:
      setting the SCL path level to high;
      switching the SDA path to an input status;
      setting the availability register corresponding to the first preset address or the second preset address;
      setting the SCL path level to low; and
      switching the SDA path to an output status, and
   wherein operations in the stop time sequence sequentially comprise:
      setting the SDA path level to low;
      setting the SCL path level to high; and
      setting the SDA path level to high.

13. The detection apparatus according to claim 9, wherein the processor being configured to perform the concurrent probe on the M optical module cages coupled to the M paths that are in the N paths and whose occupancy status are not occupied by the system software to obtain the probe result comprises the processor being configured to:
   perform a concurrent probe on a first preset address for the M optical module cages; and
   perform a probe on a second preset address for the M optical module cages,
   wherein, for any of the M optical module cages, no optical module is available in the M optical module cages when no optical module is available in the first preset address,
   wherein one of the optical modules is available when one of the optical modules is available in the first preset address and no optical module is available in the second preset address, and
   wherein a compact optical module is available when one of the optical modules is available in the first preset address and one of the optical modules is available in the second preset address.

14. The detection apparatus according to claim 13, wherein the N paths are N inter-integrated circuit (I2C) paths, wherein each I2C path comprises a serial clock (SCL) path and a serial data (SDA) path, wherein the SCL path is controlled by an SCL level register, wherein the SDA path is controlled by an SDA level register and an SDA control register, and wherein the processor is further configured to:
   a. determine, according to a preset I2C time sequence, a current operation and target paths corresponding to the current operation; and determine, according to the current operation, a first register value to be written into a register corresponding to the target paths;
   b. read a second register value of the register corresponding to the target paths;
   c. perform an AND operation on a negated conflict register value and the first register value to obtain a third register value after negation is performed on the conflict register value; and perform an AND operation on the conflict register value and the second register value, to obtain a fourth register value;
   d. perform an OR operation on the third register value and the fourth register value to obtain a fifth register value; and write the fifth register value into the register corresponding to the target paths, wherein the target paths are SCL paths of the M paths or SDA paths of the M paths, wherein the register corresponding to the target paths is the SCL level register when the target paths are the SCL paths of the M paths, and wherein the register corresponding to the target paths is the SDA level register or the SDA control register when the target paths are the SDA paths of the M paths;
   perform step a, step b, step c, and step d repeatedly according to the preset I2C time sequence until statuses of the SDA paths of the M paths are switched from output to input;
   f. read a seventh register value of an availability register corresponding to the first preset address;
   g. perform an AND operation on the negated conflict register value and a sixth register value to obtain an eighth register value after negation is performed on the conflict register value; and perform an AND operation on the conflict register value and the seventh register value, to obtain a ninth register value; and
   h. perform an OR operation on the eighth register value and the ninth register value to obtain a tenth register value to be written into the availability register corresponding to the first preset address, wherein the tenth register value is used to indicate the probe result that is obtained after the concurrent probe is performed on the first preset address for the M optical module cages.

15. The detection apparatus according to claim 13, wherein the N paths are N inter-integrated circuit I2C paths, each I2C path comprises a serial clock (SCL) path and a serial data (SDA) path, wherein the SCL path is controlled by an SCL level register, wherein the SDA path is controlled by an SDA level register and an SDA control register, and wherein the processor is further configured to:
   a. determine, according to a preset I2C time sequence, a current operation and target paths corresponding to the current operation; and determine, according to the current operation, a first register value to be written into a register corresponding to the target paths;
   b. read a second register value of the register corresponding to the target paths;
   c. perform an AND operation on a negated conflict register value and the first register value to obtain a third register value after negation is performed on the conflict register value; and perform an AND operation on the conflict register value and the second register value to obtain a fourth register value;
   d. perform an OR operation on the third register value and the fourth register value to obtain a fifth register value;

and write the fifth register value into the register corresponding to the target paths, wherein the target paths are SCL paths of the M paths or SDA paths of the M paths, wherein the register corresponding to the target paths is the SCL level register when the target paths are the SCL paths of the M paths, and wherein the register corresponding to the target paths is the SDA level register or the SDA control register when the target paths are the SDA paths of the M paths;

perform step a, step b, step c, and step d repeatedly according to the preset I2C time sequence until statuses of the SDA paths of the M paths are switched from output to input;

e. read a sixth register value of the SDA level register;

f. read a seventh register value of an availability register corresponding to the second preset address;

g. perform an AND operation on the negated conflict register value and the sixth register value to obtain an eighth register value after negation is performed on the conflict register value; and perform an AND operation on the conflict register value and the seventh register value to obtain a ninth register value; and h. perform an OR operation on the eighth register value and the ninth register value to obtain a tenth register value to be written into the availability register corresponding to the second preset address, wherein the tenth register value is used to indicate the probe result that is obtained after the probe is performed on the second preset address for the M optical module cages.

16. The detection apparatus according to claim 15, wherein the preset I2C time sequence sequentially comprises;
a start time sequence;
an address probe time sequence and a read/write time sequence;
an acknowledgement time sequence; and
a stop time sequence,
wherein operations in the start time sequence sequentially comprise:
  setting a SDA path level to high;
  setting a SCL path level to high;
  setting the SDA path level to low; and
  setting the SCL path level to low,
wherein operations in the address probe time sequence and the read/write time sequence sequentially comprise:
  setting the SDA path level to high;
  performing step i, step j, and step k repeatedly for I times; and
  setting the SCL path level to low,
wherein I is a preset value,
wherein step i, step j, and step k comprise:
  step i: setting the SCL path level to low;
  step j: setting the SDA path level according to the first preset address or the second preset address; and
  step k: setting the SCL path level to high,
wherein operations in the acknowledgement time sequence sequentially comprise:
  setting the SCL path level to high;
  switching the SDA path to an input status;
  setting the availability register corresponding to the first preset address or the second preset address;
  setting the SCL path level to low; and
  switching the SDA path to an output status, and
wherein operations in the stop time sequence sequentially comprise:
  setting the SDA path level to low;
  setting the SCL path level to high; and
  setting the SDA path level to high.

17. A system, comprising:
N optical module cages; and
a detection apparatus concurrently coupled to the N optical module cages using N paths, wherein the detection apparatus comprises:
  a conflict register;
  an availability register; and
  a processor coupled to the conflict register and the availability register and configured to:
    access the conflict register;
    acquire an occupancy status of the N paths according to a conflict register value;
    perform a concurrent probe on M optical module cages coupled to M paths that are in the N paths and whose occupancy status are not occupied by a system software to obtain a probe result that comprises availability information of a plurality of optical modules of the M optical module cages and a type of the optical modules, wherein M and N are both positive integers, and wherein M is less than or equal to N; and
    write the probe result into the availability register.

18. The system according to claim 17, wherein the processor being configured to perform the concurrent probe on the M optical module cages coupled to the M paths that are in the N paths and whose occupancy status are not occupied by the system software to obtain the probe result comprises the processor being configured to:
  perform a concurrent probe on a first preset address for the M optical module cages;
  determine that no optical module is available in the M optical modules cages when an availability status of the first preset address is unavailable;
  perform a probe on a second preset address for any of the M optical module cages when an availability status of the first preset address is available;
  determine that one of the optical modules is available in the M optical module cages when an availability status of the second preset address is unavailable; and
  determine that a compact optical module is available in the M optical module cages when an availability status of the second preset address is available.

19. The system according to claim 18, wherein the N paths are N inter-integrated circuit (I2C) paths, wherein each I2C path comprises a serial clock (SCL) path and a serial data (SDA) path, wherein the detection apparatus further comprises an SCL level register, an SDA level register and an SDA, control register, wherein the SCL path is controlled by the SCL level register, wherein the SDA path is controlled by the SDA level register and the SDA control register; and wherein the processor is further configured to:
  a. determine, according to a preset I2C time sequence, a current operation and target paths corresponding to the current operation; and determine, according to the current operation, a first register value to be written into a register corresponding to the target paths;
  b. read a second register value of the register corresponding to the target paths;
  c. perform an AND operation on a negated conflict register value and the first register value, to obtain a third register value after negation is performed on the conflict register value; and performing an AND operation on the conflict register value and the second register value to obtain a fourth register value;

d. perform an OR operation on the third register value and the fourth register value to obtain a fifth register value; and write the fifth register value into the register corresponding to the target paths, wherein the target paths are SCL paths of the M paths or SDA paths of the M paths, wherein the register corresponding to the target paths is the SCL level register when the target paths are the SCL paths of the M paths, and wherein the register corresponding to the target paths is the SDA level register or the SDA control register when the target paths are the SDA paths of the M paths;

perform step a, step b, step c, and step d repeatedly according to the preset I2C time sequence until statuses of the SDA paths of the M paths are switched from output to input;

e. read a sixth register value of the SDA level register;
f. read a seventh register value of an availability register corresponding to the first preset address;
g. perform an AND operation on the negated conflict register value and the sixth register value to obtain an eighth register value after negation is performed on the conflict register value; and performing an AND operation on the conflict register value and the seventh register value to obtain a ninth register value; and
h. perform an OR operation on the eighth register value and the ninth register value to obtain a tenth register value to be written into the availability register corresponding to the first preset address, wherein the tenth register value is used to indicate the probe result that is obtained after the concurrent probe is performed on the first preset address for the M optical module cages.

20. The system according to claim 17, wherein the processor being configured to perform the concurrent probe on the M optical module cages coupled to the M paths that are in the N paths and whose occupancy status are not occupied by the system software to obtain the probe result comprises the processor being configured to:
   perform a concurrent probe on a first preset address for the M optical module cages, and
   perform a probe on a second preset address for the M optical module cages,
   wherein, for any of the M optical module cages, no optical module is available in the M optical module cages when an availability status of the first preset address is unavailable,
   wherein one of the optical modules is available in the M optical module cages when an availability status of the first preset address is available and an availability status of the second preset address is unavailable, and
   wherein a compact optical module is available in the M optical module cages when an availability status of the first preset address is available and an availability status of the second preset address is available.

21. The system according to claim 20, wherein the N paths are N inter-integrated circuit (I2C) paths, wherein each I2C path comprises a serial clock (SCL) path and a serial data (SDA) path, wherein the detection apparatus further comprises an SCL level register, an SDA level register and an SDA control register, wherein the SCL path is controlled by the SCL level register, wherein the SDA path is controlled by the SDA level register and the SDA control register; and wherein the processor is further configured to:
   a. determine, according to a preset I2C time sequence, a current operation and target paths corresponding to the current operation; and determine, according to the current operation, a first register value to be written into a register corresponding to the target paths;
   b. read a second register value of the register corresponding to the target paths;
   c. perform an AND operation on a negated conflict register value and the first register value, to obtain a third register value after negation is performed on the conflict register value; and performing an AND operation on the conflict register value and the second register value to obtain a fourth register value;
   d. perform an OR operation on the third register value and the fourth register value to obtain a fifth register value; and write the fifth register value into the register corresponding to the target paths, wherein the target paths are SCL paths of the M paths or SDA paths of the M paths, wherein the register corresponding to the target paths is the SCL level register when the target paths are the SCL paths of the M paths, and wherein the register corresponding to the target paths is the SDA level register or the SDA control register when the target paths are the SDA paths of the M paths;
   perform step a, step b, step c, and step d repeatedly according to the preset I2C time sequence until statuses of the SDA paths of the M paths are switched from output to input;
   e. read a sixth register value of the SDA level register;
   f. read a seventh register value of an availability register corresponding to the first preset address;
   g. perform an AND operation on the negated conflict register value and the sixth register value to obtain an eighth register value after negation is performed on the conflict register value; and performing an AND operation on the conflict register value and the seventh register value to obtain a ninth register value; and
   h. perform an OR operation on the eighth register value and the ninth register value to obtain a tenth register value to be written into the availability register corresponding to the first preset address, wherein the tenth register value is used to indicate the probe result that is obtained after the concurrent probe is performed on the first preset address for the M optical module cages.

22. The system according to claim 20, wherein the N paths are N inter-integrated circuit I2C paths, each I2C path comprises a serial clock (SCL) path and a serial data (SDA) path, wherein the SCL path is controlled by an SCL level register, wherein the SDA path is controlled by an SDA level register and an SDA control register, and wherein the processor is further configured to:
   a. determine, according to a preset I2C time sequence, a current operation and target paths corresponding to the current operation; and determine, according to the current operation, a first register value to be written into a register corresponding to the target paths;
   b. read a second register value of the register corresponding to the target paths;
   c. perform an AND operation on a negated conflict register value and the first register value to obtain a third register value after negation is performed on the conflict register value; and perform an AND operation on the conflict register value and the second register value to obtain a fourth register value;
   d. perform an OR operation on the third register value and the fourth register value to obtain a fifth register value; and write the fifth register value into the register corresponding to the target paths, wherein the target paths are SCL paths of the M paths or SDA paths of the M paths, wherein the register corresponding to the target paths is the SCL level register when the target paths are the SCL paths of the M paths, and wherein the register corresponding to the target paths is the SDA level register or the SDA control register when the target paths are the SDA paths of the M paths; and perform step a, step b, step c, and step d repeatedly according to the preset I2C time sequence until statuses of the SDA paths of the M paths are switched from output to input;

e. read a sixth register value of the SDA level register;

f. read a seventh register value of an availability register corresponding to the second preset address;

g. perform an AND operation on the negated conflict register value and the sixth register value to obtain an eighth register value after negation is performed on the conflict register value; and perform an AND operation on the conflict register value and the seventh register value to obtain a ninth register value; and h. perform an OR operation on the eighth register value and the ninth register value to obtain a tenth register value to be written into the availability register corresponding to the second preset address, wherein the tenth register value is used to indicate the probe result that is obtained after the probe is performed on the second preset address for the M optical module cages.

\* \* \* \* \*